United States Patent
Hunt et al.

(10) Patent No.: US 9,914,460 B2
(45) Date of Patent: Mar. 13, 2018

(54) CONTEXTUAL SCORING OF AUTOMOBILE DRIVERS

(71) Applicant: McAfee, Inc., Santa Clara, CA (US)

(72) Inventors: Simon Hunt, Naples, FL (US); Venkata Ramanan Sambandam, Sunnyvale, CA (US); Prasanna Venkateswaran, Chennai (IN)

(73) Assignee: McAfee, LLC, Plano, TX (US)

( * ) Notice: Subject to any disclaimer, the term of this patent is extended or adjusted under 35 U.S.C. 154(b) by 0 days.

(21) Appl. No.: 14/866,366

(22) Filed: Sep. 25, 2015

(65) Prior Publication Data

US 2017/0088142 A1    Mar. 30, 2017

(51) Int. Cl.
*B60W 40/09* (2012.01)
*B60W 30/08* (2012.01)
*B60W 40/08* (2012.01)

(52) U.S. Cl.
CPC ............ *B60W 40/09* (2013.01); *B60W 30/08* (2013.01); *B60W 2040/0809* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,606,492 B1 * | 12/2013 | Botnen | G07C 5/008 701/123 |
| 8,996,234 B1 * | 3/2015 | Tamari | G07C 5/0808 701/123 |
| 2003/0095046 A1 | 5/2003 | Borugian | |
| 2006/0053038 A1 | 3/2006 | Warren et al. | |
| 2006/0078853 A1 * | 4/2006 | Lanktree | G09B 19/167 434/62 |
| 2008/0082372 A1 | 4/2008 | Burch | |
| 2009/0024419 A1 * | 1/2009 | McClellan | G06Q 40/02 705/4 |

(Continued)

FOREIGN PATENT DOCUMENTS

| | | |
|---|---|---|
| WO | 2014031723 A2 | 2/2014 |
| WO | 2017052945 | 3/2017 |

OTHER PUBLICATIONS

International Search Report and Written Opinion issued in PCT Patent Application No. PCT/US2016/048511 dated Dec. 5, 2016; 15 pages.

*Primary Examiner* — Jonathan M Dager
(74) *Attorney, Agent, or Firm* — Patent Capital Group

(57) ABSTRACT

In an example, there is disclosed a computing apparatus, including: a driver identity detector to detect the identity of a driver; and one or more logic elements providing a driver competency engine, operable to: detect the identity of the driver; evaluate the driver's operation of a vehicle; and build a driver competency profile based at least in part on the evaluating. The driver competency engine may further be operable to detect a context of the operation, such as environmental factors. There is also described a method of providing a driver competency engine, and one or more computer readable mediums having stored thereon executable instructions for providing a driver competency engine.

23 Claims, 5 Drawing Sheets

(56) References Cited

U.S. PATENT DOCUMENTS

| | | | |
|---|---|---|---|
| 2010/0205012 A1* | 8/2010 | McClellan | G06Q 40/08 705/4 |
| 2013/0073114 A1* | 3/2013 | Nemat-Nasser | B60W 40/09 701/1 |
| 2013/0164712 A1* | 6/2013 | Hunt | B60W 40/09 434/65 |
| 2013/0164715 A1* | 6/2013 | Hunt | G09B 19/167 434/65 |
| 2013/0261846 A1* | 10/2013 | McQuade | G06F 17/00 701/2 |
| 2013/0261907 A1* | 10/2013 | McQuade | F02D 41/2425 701/51 |
| 2013/0261942 A1* | 10/2013 | McQuade | F02D 29/02 701/115 |
| 2014/0180557 A1* | 6/2014 | Hunt | B60T 8/172 701/99 |
| 2014/0222245 A1* | 8/2014 | Chang | B60W 50/14 701/1 |
| 2014/0272810 A1* | 9/2014 | Fields | G09B 19/14 434/65 |
| 2014/0272811 A1* | 9/2014 | Palan | G07C 5/008 434/66 |
| 2015/0106289 A1* | 4/2015 | Basir | B60W 40/09 705/325 |
| 2015/0235485 A1* | 8/2015 | Nemat-Nasser | G07C 5/08 701/1 |

* cited by examiner

CONTEXTUAL SCORING OF AUTOMOBILE DRIVERS

FIELD OF THE SPECIFICATION

This disclosure relates in general to the field of public safety, and more particularly, though not exclusively to, a system and method for contextual scoring of automobile drivers.

BACKGROUND

Broadly stated, advanced driver assistance systems (ADAS) help a driver to operate a car. As used in this specification, an ADAS may be any system that helps a driver, ranging from collecting information and statistics to improve driving habits, to providing instantaneous feedback, to controlling specific subsystems in limited circumstances, to full, autonomous control of the vehicle, either in selected circumstances, or full-time (the latter may be known as "self-driving cars").

An ADAS may enhance vehicle safety by helping the driver to operate the automobile safely and effectively. An ADAS may also be used to optimize safe operation, such as advising the driver of habits that improve fuel efficiency or reduce emissions, providing maintenance reminders, and flagging behaviors that are hard on the vehicles mechanical or electrical systems. An ADAS may also help to avoid collisions and accidents by alerting drivers to dangers and even applying the brakes in selected circumstances. Some modern vehicles short of full-time autonomous operation provide limited automated operation, such as parallel parking.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
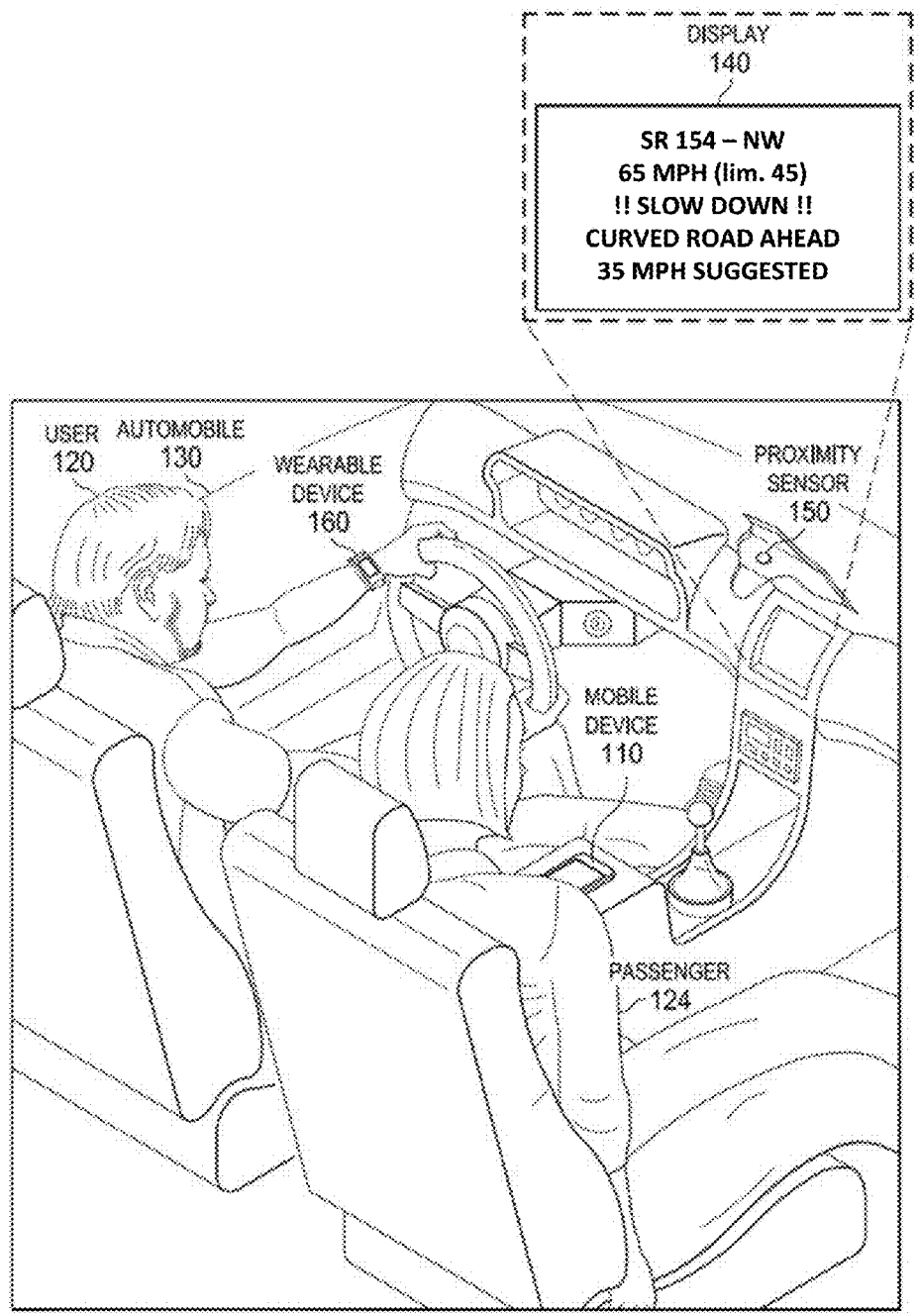
FIG. 1 is a perspective view of a user operating an ADAS-equipped vehicle according to one or more examples of the present specification.

In an example, there is disclosed a computing apparatus, including: a driver identity detector to detect the identity of a driver; and one or more logic elements providing a driver competency engine, operable to: detect the identity of the driver; evaluate the driver's operation of a vehicle; and build a driver competency profile based at least in part on the evaluating. The driver competency engine may further be operable to detect a context of the operation, such as environmental factors. There is also described a method of providing a driver competency engine, and one or more computer readable mediums having stored thereon executable instructions for providing a driver competency engine.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The present specification provides an improved ADAS that accounts for the skills and capabilities of the driver, as well as the context of operation.

It is recognized in this specification that not all drivers have equivalent driving skills. And even among drivers with similar levels of overall skill, there may be particular contexts one skill set applies better than in other contexts. For example, a professional racecar driver may be presumed to have overall better skills in handling a vehicle then a teenager who recently received his first driver's license. On the other hand, a taxicab driver may have the same number of overall hours behind the will as a professional racecar driver, but their skill sets may be very different. The professional racecar driver might be expected to better handle high speeds, tight turns, and highly competitive environments. The taxicab driver, who lives in a crowded metropolis, may be expected to better handle traffic, crowded streets, pedestrians, and traffic interruptions that may arise in city context.

Even between two experienced taxicab drivers with an identical number of hours behind the wheel, a driver from Denver, Colo. may be expected to better handle snow and ice conditions than a driver from San Antonio, Tex. On the other hand, the San Antonio driver may be better able to handle a car in the event of extreme heat or flash floods.

Thus, an effective ADAS may account for these differences in driver skill levels, and in specific skill sets as that applied to particular operating contexts.

Advantageously, as the driver operates the vehicle, a stateful user profile may be built that keeps track of the user's competency in various contexts. The user profile is stateful because every time the user operates a vehicle with the ADAS, contextual insights may be cross-correlated with user's performance, and the user profile may be continuously updated.

As the user profile is updated, it becomes more accurate and more useful. A contextual user profile may then be used for any suitable purpose. For example, and an ADAS may provide contextual advice to the user based on current operating conditions and that user's past performance in similar conditions. In cases where the ADAS is able to take at least partial control of the vehicle, ADAS may determine when the user encounters a situation that is most likely beyond his or her capabilities. In that case, the ADAS may take control of the vehicle, or of particular parts of the vehicle. For example, if a user encounters an emergency situation that could results in an accident, a highly skilled user may actually be able to evaluate the situation and take appropriate evasive action better than the ADAS. Thus, in that context, the ADAS may leave the situation to the user. However, a new driver's evaluation and reaction abilities may be less trustworthy and more likely to result in an accident. In that case, the ADAS may take appropriate action such as applying the brakes, steering the car, or otherwise avoiding the accident.

In another example, anonymized contextual user profiles may be provided to regulatory bodies or other government entities. This may enable those regulatory bodies to make better and more informed decisions about how private citizens operate their motor vehicles. In yet another example, a rental car agency may equip its vehicles with a contextual ADAS that judges when a user is operating the vehicle beyond his or her expected capabilities. In that case, the ADAS may apply appropriate safeguards, such as a speed regulator, or may report abuse of the vehicle to the rental car agency, which may charge additional fees to discourage such behavior.

In yet another example, an insurance company may provide premium discounts to users who install a contextual ADAS and can prove that they operate their vehicles safely.

In yet another example, parents of a new driver may install a contextual ADAS to limit the conditions under which the new driver a operated vehicle. For example, the vehicle may have reduced operation (via a speed regulator, for example), or even refuse to operate at all, if the new driver tries to drive at night, in poor weather conditions, or with too many people in the car. This may help to prevent abuses of the new driving privileges.

A driver's contextual profile may be built over time by monitoring the driver's exposure to driving under different conditions, different environments, and different vehicles. The driver's contextual profile may be continuously tuned as the driver gets more experience and exposed to different driving conditions.

This specification also provides a mechanism to utilize the driver's contextual profile and match against the current driving conditions to determine any deviation from the driver's comfort zone. The mechanism would warn the user if the deviation gets dangerous.

As disclosed herein, the driver's contextual profile is a multi-dimensional capability matrix of the driver. This captures the proficiency of the driver across the different driving conditions disclosed herein. The driver's contextual profile is built over time and is continually updated when the driver gets more and more exposure driving under different driving conditions.

For example, in a three-dimensional matrix, a driver may be assigned a score for a range of terrains and weather conditions. Thus, the user's competency is cross-correlated to terrain and weather. With sufficient computer power and model complexity, this can be expanded to an n-dimensional matrix, where the driver is assigned one or more competency scores across n contextual axes.

The driver competency engine may also make normalized recommendations. For example, driving parameters (such as current speed and g-force) and the current driving conditions of a plurality of drivers who are using a driver assistance computer may be "crowd sourced" to an aggregation server, where normalized driving recommendation for drivers with different proficiency levels in different driving conditions and vehicle types is computed. Standard statistical methods may be used to normalize these data.

Some examples of computing contextual driving conditions include the following, by way of nonlimiting example.

Weather: weather can sensed directly by sensors in the car such as rain sensors, temperature sensors, pressure sensors, and visibility detectors. Alternatively, a digital weather report for the current location can be retrieved over the network. The experience level of the driver for the weather condition impacts the recommended driving parameters. For example if the driver is new to icy conditions, the recommended speed and g-force would be less than a person who is used to driving in icy conditions.

Terrain: a geographic information system (GIS) service may be used to receive and evaluate terrain based on the current global positioning system (GPS)-provided position. The experience level of the driver for the terrain type impacts the recommended driving parameters. In cases where GPS coordinates do not update with sufficient frequency or precision, other sensors such as an accelerometer and integrators may be used to provided updated location information, which can be periodically cross-checked and corrected against GPS coordinates.

Vehicle Capabilities: A driver who is experienced in a sedan may not do as well in a high-powered sports coupe. Factors such as engine torque, power, and stability control may thus provide appropriate inputs. The driver's experience in driving the same grades of vehicles as the current vehicle impacts the risk of recommended driving parameters.

Other contextual factors discussed herein may be sensed and computed with similar methods.

After computing the current driving conditions, the normalized driving speed and g-force of similarly skilled drivers driving in similar driving condition may be fetched from an aggregation server. The deviation of the current speed and g-force from the normalized factors are calculated frequently, and a risk factor may be derived therefrom.

The risk factor is a measure of deviations of current speed & g-force from the recommended values for the current driving conditions. The following is one nonlimiting example of computing a risk factor. A risk factor of '0' implies minimal risk, and a risk factor of '1' implies high risk.

$$RF = \frac{avg(DS, DG)}{100}$$

RF represents the computed risk factor.
DS represents the normalized speed deviation.
DG represents the normalized g-force deviation.
To compute the foregoing:

$$DS = Clamp_{0,100}\left(\left(\frac{SC*AF - SN}{SN}\right) \times 100\right)$$

Where SC represents the current speed.
SN represents the normalized speed.
AF represents an "ambience factor" derived from the current context.

$$DG = Clamp_{0,100}\left(\left(\frac{GC*AF - GN}{GN}\right) \times 100\right)$$

Where GC represents the current g-force.
GN represents the normalized g-force.
AF represents an ambience factor derived from the current context.

$$Clamp_{x,y}(N) = max(x, min(N,y))$$

This clamps N to the segment (x,y), wherein x is the minimum permitted value and y is the maximum permitted value. For $Clamp_{0,100}$, any value below 0 is clamped to 0, and any value above 100 is clamped to 100.

Ambience factor may be a composite score of the total ambient distractions to the driver, and may include any of the contextual factors disclosed herein.

In one example, when the risk factor exceeds a threshold, a warning is raised to the driver with recommendations on what to do. For example if the deviation in speed is high, the driver can be instructed to bring down the speed. If g-forces are high, the driver can be warned of tight cornering.

The driver's experience and competency in a given driving context may be regularly updated. This may not always be a linear improvement. Some drivers will degrade in skill over time, and this may be accounted for in the risk factor.

By continuously profiling both the driver's behavior and contextual conditions, the current risk level may also be profiled according to useful template. For example, an abrupt driving style, unfamiliar high performance vehicle, heavy traffic, low powered car, icy conditions, driving at night may all be relatively high risk.

A moderate driving style, car with advanced safety features, light traffic, and high visibility may all be relatively low risk.

Advantageously, the risk profile is fully dynamic. If a sunny day turns into stormy weather, and the driver has minimum experience driving in the rain, the risk indicator may indicate a higher level as the storm passes and corrective actions can be suggested.

A system and method for contextual scoring of automobile drivers will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 2:
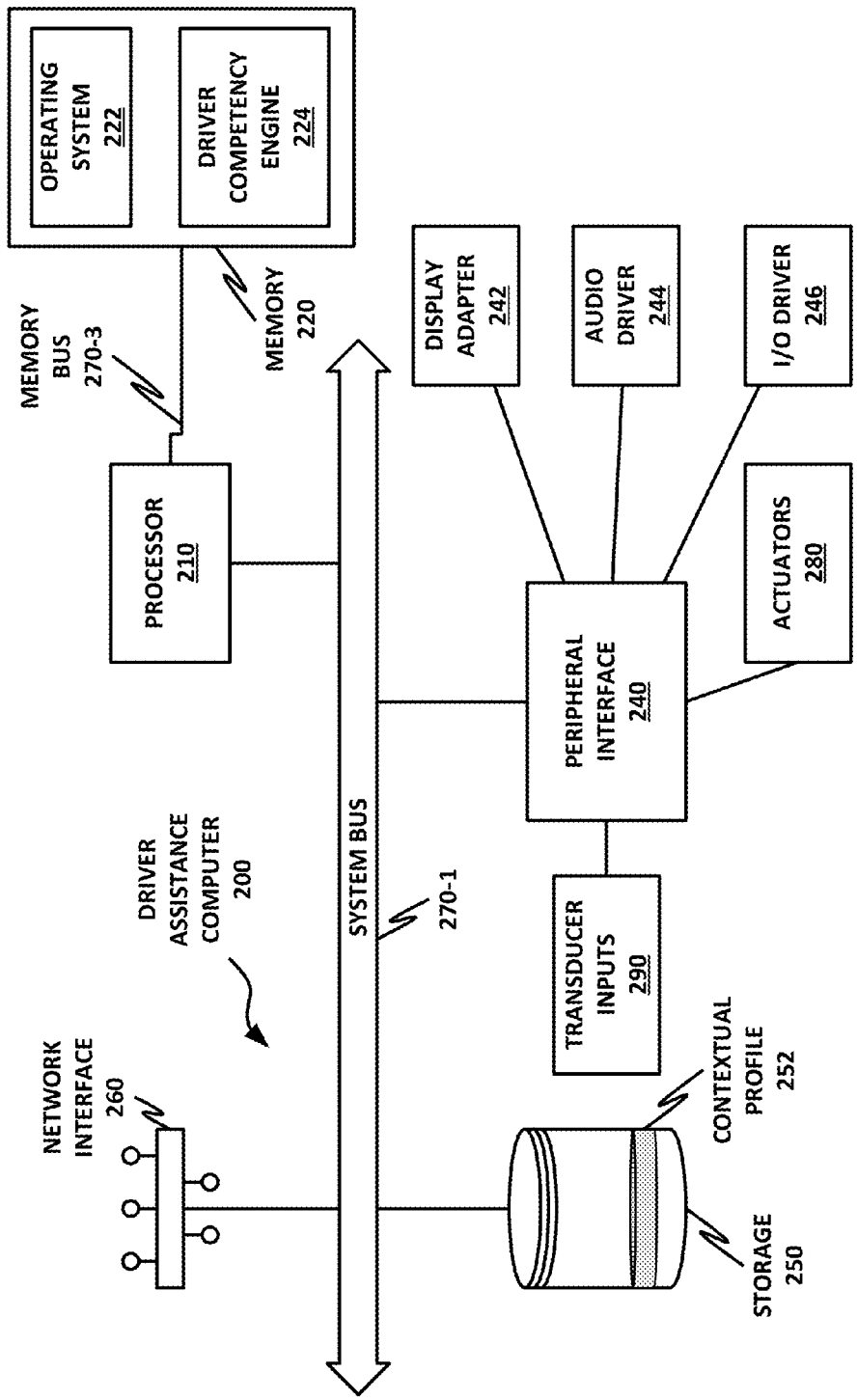
FIG. 2 is a block diagram of a driver assistance computer according to one or more examples of the present specification.

FIG. 1 is a perspective view of a user 120 operating an automobile 130, which may be equipped with a driver assistance computer 200 (FIG. 2). An automobile 130 is used herein by way of nonlimiting example, but it should be understood that the system and methods disclosed herein may be equally applicable to any suitable type of vehicle, such as aircraft, spacecraft, bicycles, and water craft by way of nonlimiting example. In those examples, the "driver" should be understood to be any operator or controller of the vehicle to whom the methods of this specification apply.

Driver assistance computer 200 is not visible in this perspective view, as it may be embedded for example within automobile 130, so that it is not visible to a user. Nevertheless, in some embodiments, driver assistance computer 200 could be an after-market add-on that is visible to user 120.

In this example, user 120 has a passenger 124 inside of automobile 130. The presence of a passenger 124 may be a contextual input that influences the operation of driver assistance computer 200. Automobile 130 may also be equipped with a proximity sensor 150, which may detect the presence of user 120 and passenger 124.

One factor in providing a contextual user profile is identifying user 120. In this specification, identifying user 120 can be accomplished via any suitable mechanism. For example, a wearable device 160, mobile device 110, or other electronic mechanism may provide an identification token, such as a cryptographically-signed certificate. These devices may communicate via Wi-Fi, Bluetooth, or some other suitable means. In another example, a device or person is equipped with an embedded radio frequency identification (RFID) token, which can identify the user. Depending on the desired level of security, identification may be very simple and straightforward, or may be highly secure. In a case where high-security is desired, an asymmetric encryption key with an appropriate attestation protocol may be used. In a case where convenience is at a premium over security, proximity sensor 150 may be equipped with a camera, and facial recognition may be used to access the appropriate driver profile. In another example, a display 140 may be provided, which may be a touch screen display, or other input/output device. In that case, user 120 may be asked to simply select the appropriate driver profile, optionally with a PIN or password for some level of security.

Automobile 130 may also be equipped with various transducers and sensors that can help to confirm the identity of user 120, as well as providing additional context. For example, if a teenager attempts to use his mother's profile so that he can gain access to more advanced operational features, weight sensors in the seat may determine that his weight is substantially different from a stored profile weight, and may either deny access, or require additional authentication before granting access.

In yet other examples, a proximity sensor 150 may attempt to establish, such as through facial characteristics or a weight profile, the age, gender, size, or identity of passenger 124. This may also influence the user's contextual profile. For example, a teenage driver who has his girlfriend in the car may be more distracted than if he has an adult male, and it may therefore be appropriate to adjust his profile accordingly.

Other sensors may provide contextual inputs including, by way of nonlimiting example, weather, visibility, temperature, time of day, road conditions, traffic, road type, road shape, road size, terrain type, construction, vehicle type, vehicle capabilities (such as handling and speed), vehicle condition, vehicle maintenance condition, presence of passengers, number of passengers, noise level, identity of passengers, and driver's stress level (which may be measured by biometric sensors).

Based on the user's stateful contextual profile 252 (FIG. 2), driver assistance computer 200 may take appropriate action. In some cases, as mentioned above, this may be in the form of taking full or partial control of the vehicle, or reporting statistics to various entities.

In the example of FIG. 1, driver assistance computer 200 may also operate display 140. In some cases, display 140 may interact with a GPS other data system, to provide real-time data to user 120. In this example, driver assistance computer 200 informs user 120 that he is currently driving Northwest on State Route 154. Driver assistance computer 200 also notes that automobile 130 is moving at 65 mph, while the posted speed limit is 45 mph. Thus, driver assistance computer 200 advises driver 120 to slow down.

The advice to slow down may also include other inputs. For example, based on geographic information system (GIS) data, driver assistance computer 200 may know that there is a curved road ahead. Based on the contextual profile for user 120, driver assistance computer 200 knows that 65 mph is an unsafe speed for user 120 to drive on such a curved road. Other factors that may contribute to this advice include any of the contextual factors disclosed herein.

FIG. 2 is a block diagram of driver assistance computer 200 according to one or more examples of the present specification. Driver assistance computer 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Driver assistance computer 200 includes a processor 210 connected to a memory 220, having stored therein executable instructions for providing an operating system 222 and at least software portions of a driver competency engine 224. Operating system 222 may be any appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Other components of driver assistance computer 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of driver competency engine 224. Many other configurations are also possible, and are intended to be encompassed within the broad scope of this specification.

In an example, storage 250 is configured to store a stateful contextual profile 252. The profile is stateful because its state is preserved and modified over time, as the user continues to operate vehicle 130, and as additional inputs become available. The profile is contextual because it is not merely a naked driver capability profile that scores the driver's raw skills. Rather, the profile accounts for real-world contexts that the user has encountered or is likely to encounter.

Network interface 260 may be provided to communicatively couple driver assistance computer 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Driver competency engine 224, in one example, is operable to carry out computer-implemented methods as described in this specification. Driver competency engine 224 may include one or more tangible non-transitory computer-readable mediums having stored thereon executable instructions operable to instruct a processor to provide a driver competency engine 224. As used throughout this specification, an "engine" includes any combination of one or more logic elements, of similar or dissimilar species, operable for and configured to perform one or more methods provided by the engine. Thus, driver competency engine 224 may comprise one or more logic elements configured to provide methods as disclosed in this specification. In some cases, driver competency engine 224 may include a special integrated circuit designed to carry out a method or a part thereof, and may also include software instructions operable to instruct a processor to perform the method. In some cases, driver competency engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that driver competency engine 224 may also include other hardware and software, including configuration files, registry entries, and interactive or user-mode software by way of non-limiting example.

In one example, driver competency engine 224 includes executable instructions stored on a non-transitory medium operable to perform a method according to this specification. At an appropriate time, such as upon booting driver assistance computer 200 or upon a command from operating system 222 or a user 120, processor 210 may retrieve a copy of the instructions from storage 250 and load it into memory 220. Processor 210 may then iteratively execute the instructions of driver competency engine 224 to provide the desired method.

Figure 5:
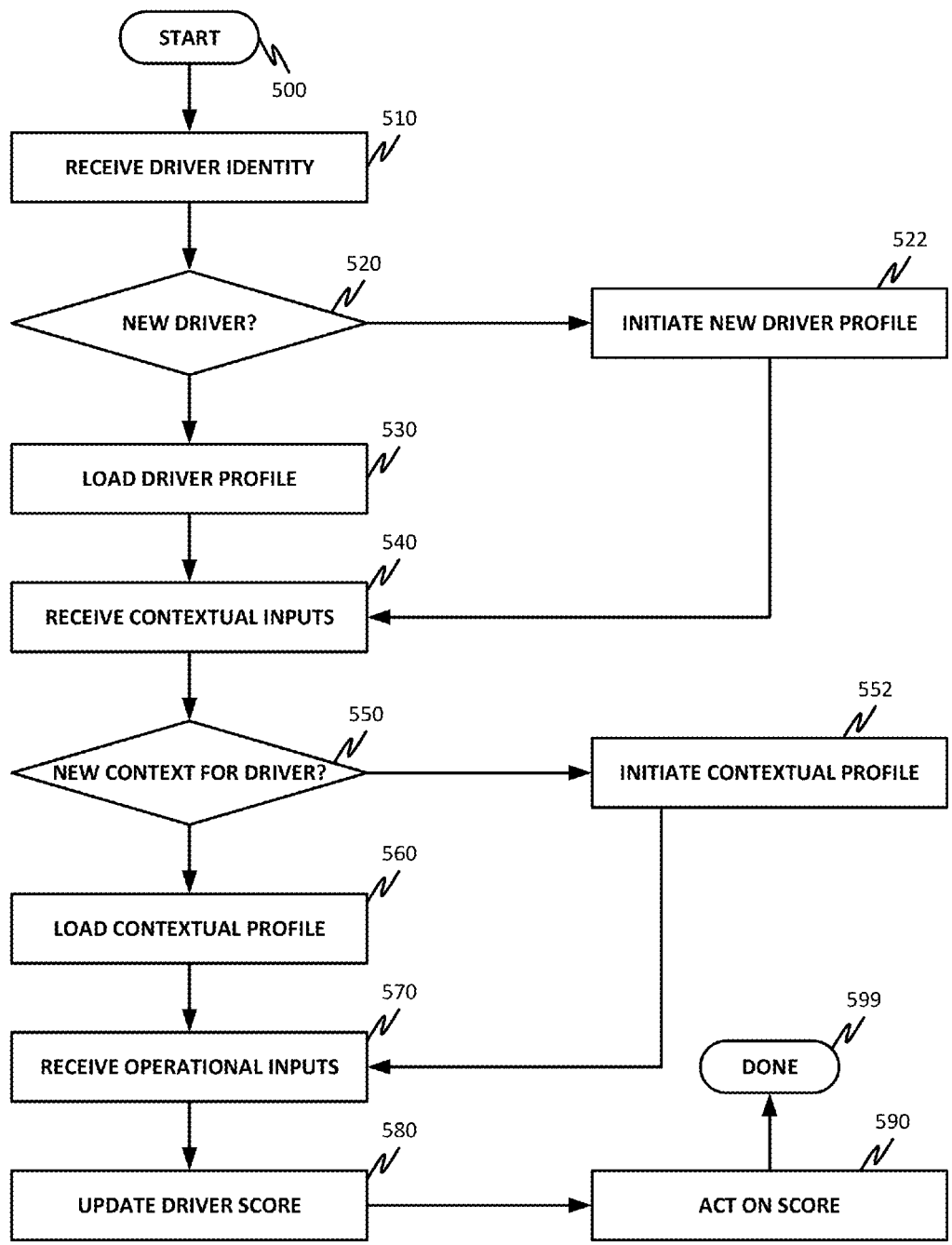
FIG. 5 is a flow chart of a method performed by a driver assistance computer according to one or more examples of the present specification.

Driver competency engine 224 may be operable to perform methods consistent with this specification, including method 500 of FIG. 5. In summary, driver competency engine 224 may be configured to receive both contextual inputs (e.g., inputs pertaining to the environment and operating conditions), and operational inputs (e.g., inputs relating to which user 120 is operating vehicle 130, and how user 120 is operating vehicle 120), and may also receive a user profile for user 120. From these inputs, driver competency engine 224 may compute an operational score that indicates how well user 120 is operating Peripheral interface 240 may be configured to interface with any auxiliary device that connects to driver assistance computer 200 but that is not necessarily a part of the core architecture of driver assistance computer 200. A peripheral may be operable to provide extended functionality to driver assistance computer 200, and may or may not be wholly dependent on driver assistance computer 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Transducer inputs 290 may also communicatively couple to peripheral interface 240. Transducer inputs include any input signals that driver competency engine 224 may use to reconstruct state information about the world around it, including contextual inputs 430 and operational inputs 432 of FIG. 4. These may include real-world sensors such as accelerometers, temperature sensors, moisture sensors, pressure sensors, integrators, strain gauges, fluid level sensors, and any other sensors that provide useful inputs. Transducer inputs may also include digital inputs that are received from other subsystems, such as fuel, oil, and maintenance sensors received from the car. Transducer inputs 290 may also include crowd-sourced inputs received via network interface 260, for example via "crowd sourcing."

Actuators 280 may also be provided. Actuators 280 may enable driver competency engine 224 to take control of automobile 130, or of certain subsystems thereof. For example, actuators 280 may enable driver competency engine to apply the brakes, let off the gas, control steering, or otherwise adjust the car. In some cases, actuators 280 may even control environmental factors. For example, if competency engine 224 determines that user 120 is less competent when it is hot and muggy, actuators 280 may be used to turn on the air conditioning or a moisture control system. Many other applications of actuators 280 are possible in assisting a driver in operating an automobile.

Figure 3:
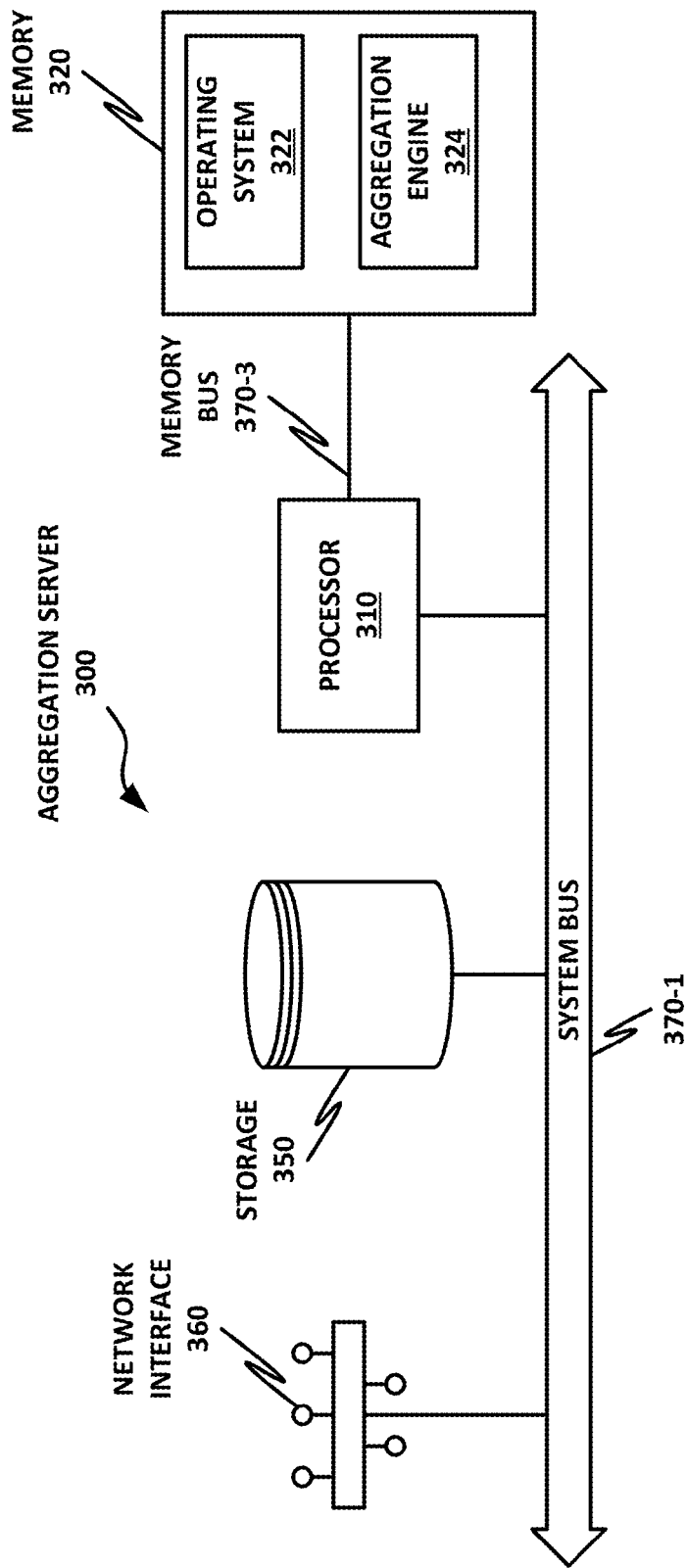
FIG. 3 is a block diagram of an aggregation server according to one or more examples of the present specification.

FIG. 3 is a block diagram of an aggregation server 300 according to one or more examples of the present specification. Aggregation server 300 may be any suitable computing device, as described in connection with FIG. 2. In general, the definitions and examples of FIG. 2 may be considered as equally applicable to FIG. 3, unless specifically stated otherwise. Aggregation server 300 is described herein separately to illustrate that in certain embodiments, logical operations according to this specification may be divided along a client-server model, wherein driver assistance computer 200 provides certain localized tasks, while aggregation server 300 provides certain other centralized tasks. In contemporary practice, aggregation server 300 is more likely than driver assistance computer 200 to be provided as a "headless" VM running on a computing cluster, or as a standalone appliance, though these configurations are not required.

Aggregation server 300 includes a processor 310 connected to a memory 320, having stored therein executable instructions for providing an operating system 322 and at least software portions of a aggregation engine 324. Other components of aggregation server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of aggregation engine 324.

In an example, storage 350 may also provide a user profile database, and a conditions database. The user profile database may include an aggregation of collected user profiles from many different users, for example, users who subscribe to a service. These may include multi-dimensional user competency scores, along with associated contextual conditions. These can be used, for example, when a user 120 encounters new conditions that do not yet have an associated context. In that case, driver competency engine 224 may query aggregation engine 300 for competency scores from similar users in similar conditions. This may allow driver competency engine 224 to make useful decisions and assign a useful score even when encountering a new context.

Network interface 360 may be provided to communicatively couple server 140 to a wired or wireless network, and may include one or more logic elements as described in FIG. 2.

Aggregation engine 324 is an engine as described in FIG. 2 and, in one example, includes one or more logic elements operable to carry out computer-implemented methods as described in this specification. Software portions of aggregation engine 324 may run as a daemon process.

Aggregation engine 324 may include one or more non-transitory computer-readable mediums having stored thereon executable instructions operable to instruct a processor to provide a aggregation engine 324. At an appropriate time, such as upon booting server 140 or upon a command from operating system 322 or a user 120 or security administrator 150, processor 310 may retrieve a copy of aggregation engine 324 (or software portions thereof) from storage 350 and load it into memory 320. Processor 310 may then iteratively execute the instructions of aggregation engine 324 to provide the desired method.

Peripheral interface 340 may be configured to interface with any auxiliary device that connects to aggregation server 300 but that is not necessarily a part of the core architecture of aggregation server 300. Peripherals may include, by way of non-limiting examples, any of the peripherals disclosed in FIG. 2. In some cases, aggregation server 300 may include fewer peripherals than driver assistance computer 200, reflecting that it may be more focused on providing processing services rather than interfacing directly with users.

Figure 4:
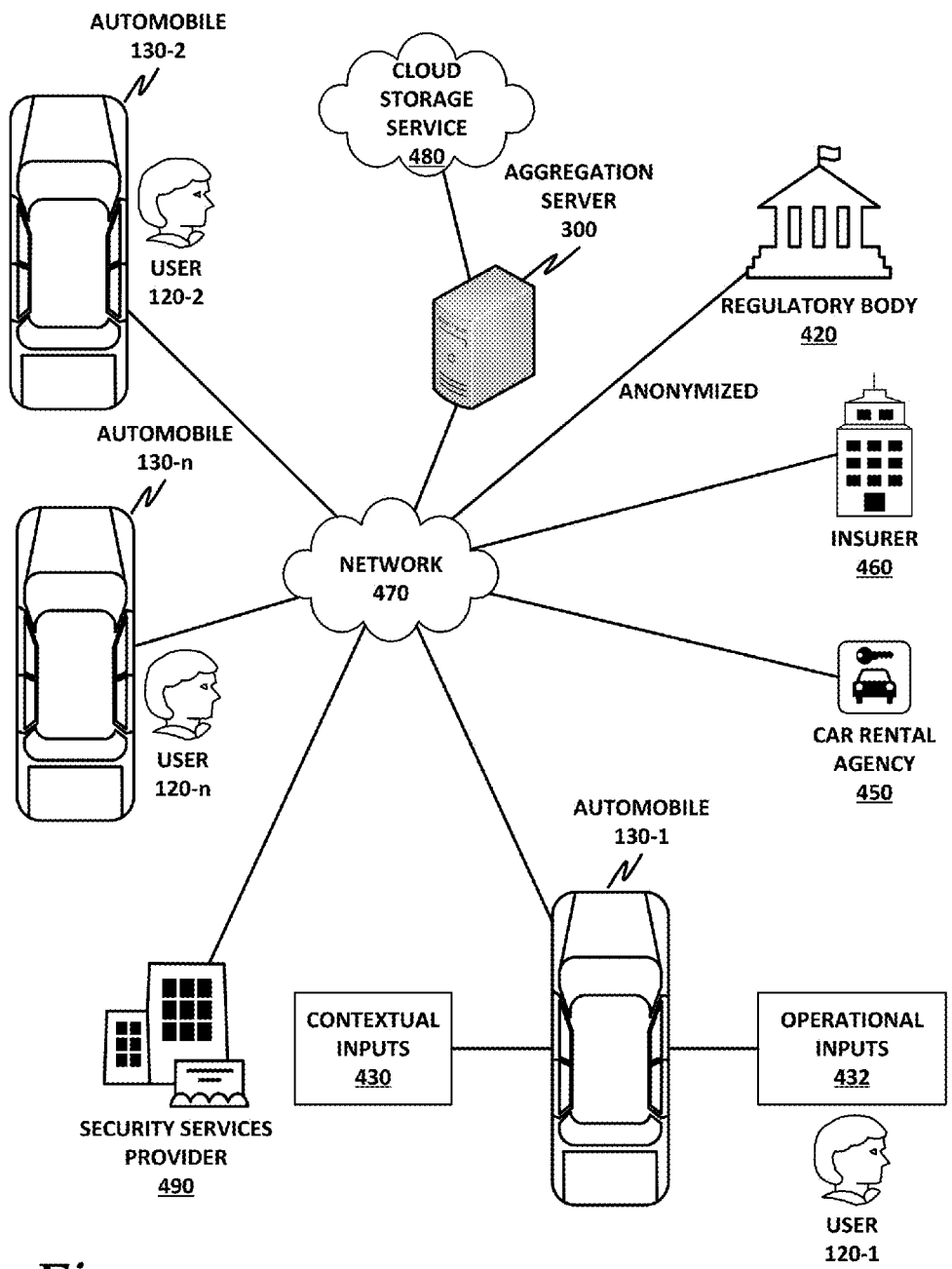
FIG. 4 is a network-level diagram of computer-assisted driving according to one or more examples of the present specification.

FIG. 4 is a network-level diagram of computer-assisted vehicle operation according to one or more examples of the present specification. In this example, a plurality of vehicles 130-1-130-*n* are equipped with driver assistance computers 200, and subscribe to an appropriate service.

Vehicles 130 may communicate with each other and to other services via network 470. Network 470 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Network 470 may also include one or more servers, firewalls, routers, switches, security appliances, antivirus servers, or other useful network devices. In this illustration, network 470 is shown as a single network for simplicity, but in some embodiments, network 470 may include a large number of networks, such as one or more enterprise intranets connected to the internet.

Each automobile 130-1 is operated by a user 120. In this example, each automobile 130 includes a driver assistance computer 200, including a driver competency engine 224 which maintains a contextual user profile 252 for each user 120. Each contextual user profile 252 may be informed by operational inputs 432, including inputs about how, and how well, user 120 operates automobile 130, and contextual inputs 430, which include information about the circumstances in which user 120 operates automobile 130.

In an embodiment, some or all automobiles 130 may upload all or part of contextual user profile 252 to aggregation server 300. Aggregation server 300 may collect contextual user profiles 252, and may aggregate and cross-correlate them to provide useful statistical and probability information. In some examples, some or all of these data may be stored in a cloud storage service 480.

When an automobile 130 encounters a context that is new for user 120, driver assistance computer 200 may query aggregation server 300 for a stored profile with a similar context for a similar user. This stored profile may be a composite profile that correlates data from many users 120 of similar skill levels in similar circumstances. This aggregate or composite profile may represent a probability that a user of a particular skill profile will operate an automobile 130 in a particular way in a specific context.

In certain embodiments, automobile 130, or aggregation server 300 may provide some or all user profiles to third parties for specific purposes. These are disclosed herein as nonlimiting examples, and it is intended that any suitable third-party should be included.

In this example, regulatory body 420 receives anonymized user profile data that enables regulatory body 420 to see overall trends of operational characteristics of users 120 operating automobiles 130. This may allow regulatory body 420 to make decisions about its regulatory function. In some cases, regulatory body 420 may be or include a law enforcement agency, in which case regulatory body 420 may demand non-anonymized user data for a particular user 120 operating a particular automobile 130 at a particular time. In some examples, aggregation server 300 provides such information only pursuant to a valid subpoena, warrant, court order, or other legal instrument.

Insurer 460 may use non-anonymized user profiles to make decisions about specific interest rates charged specific users 120. User 120 may elect to voluntarily provide these data, so that there is no need to provide them under the auspices of a subpoena or legal instrument. In other examples, insurer 460 may use aggregated and anonymized user profile data to compile actuarial tables and to adjust overall insurance rates for many users.

Car rental agency 450 may use driver assistance computer 200 to enforce safe operating policies, and to ensure that abuse of its vehicles can be detected.

Other entities such as parents, schools, or employers by way of nonlimiting example may also collect anonymized or non-anonymized user profiles.

Another valuable feature is that a user's contextual profile 252 may be portable. For example, a copy of contextual profile 252 may be stored on wearable device 160, mobile device 110, or some portable storage medium such as a USB thumb drive. In another example, a portable profile is stored in cloud storage service 480. Whenever a user 120 operates an automobile 130 that is equipped with a driver assistance computer 200, the driver assistance computer 200 may query cloud storage service 480 for a stored profile for that user. After receiving the profile, driver assistance computer 200 may then proceed to use and update contextual profile 252.

FIG. 5 is a flowchart of a method 500 of providing a driver competency engine according to one or more examples of the present specification.

In block 510, driver competency engine 224 receives the driver's identity. As discussed throughout this specification, there are many methods for determining the driver's identity. Any suitable method is intended to be encompassed within the scope of block 510.

In decision block 520, driver competency engine 224 determines whether this driver should be assigned a new profile. For example, if driver competency engine 224 does not have an existing profile for the user, and if no profile is found with aggregation server 300, then there is no profile for this user.

In block 522, if this is a new driver, then driver competency engine 224 initiates a new driver profile. In one example, this comprises creating a blank profile with no inputs. In another example, driver competency engine 224 may solicit and receive from user 120 some initial inputs to initialize the state of contextual user profile 252. Driver competency engine 224 may then create the driver profile based on a template, or may query aggregation server 300 for a composite profile of users with similar experience.

If user 120 is not a new driver, then in block 530, driver competency engine 224 loads the contextual user profile 252 from storage 250, or may receive a copy from aggregation server 300.

In block 540, driver competency engine 224 receives contextual inputs 430, which represent environmental factors that may influence operation of vehicle 130. Driver competency engine 224 then creates a context profile for the current context.

In decision block 550, driver competency engine 224 determines whether this is a new context for user 120.

If this is a new context, then in block 552, driver competency engine 224 initiates a contextual profile for user 120 in the current context. This may include creating a blank context, or querying aggregation server 300 for similar contexts with similar users 120.

If this is not a new context for user 120, then in block 560, driver competency engine 224 loads from storage 250 or from cloud storage service 480 the contextual profile. This is a profile that correlates the competency of user 120 with the current context.

In block 570, driver competency engine 224 receives operational inputs 432. These inputs represent how user 120 is operating automobile 130 within the current context. This may include, for example, how fast he is driving, how well is handling the vehicle, whether his movements are jittery or steady, how well he is obeying traffic rules, or any other factors that influences the driver's competency within the current context.

In block 580, driver competency engine 224 updates the driver's score based on the operational inputs within the current context. This may include weighting the score, or providing hysteresis or other trending data.

In block 590, driver competency engine 224 may act on the updated score in any of the ways disclosed herein. This may include, for example, taking full or partial control of the vehicle, advising user 120, or providing data to a third party.

In block 599, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in one example, a computing apparatus, comprising: a driver identity detector to detect the identity of a driver; and one or more logic elements comprising a driver competency engine, operable to: detect the identity of the driver; evaluate the driver's operation of a vehicle; and build a driver competency profile based at least in part on the evaluating.

There is also disclosed an example, wherein building the driver competency profile comprises tracking the driver's overall experience with operating the vehicle.

There is also disclosed an example, further comprising a context interface, wherein the driver competency engine is further operable to track the driver's operation of the vehicle relative to a context detected via the context interface.

There is also disclosed an example, wherein the detected context comprises a factor selected from the group consisting of weather, visibility, temperature, time of day, road conditions, traffic, road type, road shape, road size, terrain type, construction, vehicle type, vehicle capabilities, vehicle safety features, vehicle condition, vehicle maintenance state, presence of passengers, number of passengers, identity of passengers, noise level, and driver's stress level.

There is also disclosed an example, wherein the driver competency engine is further operable to load a saved driver competency profile, and wherein building the driver competency profile comprises updating the saved driver competency profile.

There is also disclosed an example, wherein loading the saved driver competency profile comprises retrieving the driver competency profile from a network location.

There is also disclosed an example, wherein evaluating the driver's operation of the vehicle comprises retrieving a composite profile of a plurality of other drivers.

There is also disclosed an example, wherein the composite profile is crowd-sourced to a network location.

There is also disclosed an example, wherein the driver competency engine is further operable to compute a current risk factor of the form $$RF = \frac{avg(DS, DG)}{K},$$

wherein RF is the risk factor, DS is a normalized speed deviation, DG is a normalized g-force deviation, and K is a constant.

There is also disclosed an example, wherein the driver competency engine is further operable to act on computing the risk factor.

There is also disclosed an example, wherein acting on the risk factor comprises providing advice for the driver.

There is also disclosed an example, wherein acting on the risk factor comprises determining that the risk factor exceeds a risk threshold and operating an actuator to take at least partial control of the vehicle.

There is also disclosed an example, wherein acting on the risk factor comprises providing data to a third party.

There is further disclosed an example of one or more tangible, non-transitory computer-readable storage mediums having stored thereon executable instructions for instructing one or more processors for providing a driver competency engine operable for performing any or all of the operations of the preceding examples.

There is further disclosed an example of a method of providing a driver competency engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A driver assistance system, comprising:
   a driver identity detector to detect the identity of a driver;
   a peripheral interface to communicatively couple to a transducer input; and
   one or more logic elements comprising a driver competency engine, configured to:
   detect the identity of the driver via the identity detector;
   evaluate the driver's operation of a vehicle according to operational inputs received from the transducer input via the operational sensor interface;
   build a driver competency profile based at least in part on the evaluating;
   compute a current risk factor of the form $$RF = \frac{avg(DS, DG)}{K},$$

wherein RF is the risk factor, DS is a normalized speed deviation, DG is a normalized g-force deviation, and K is a constant; and
   take autonomous or semi-autonomous control of the vehicle or provide user advice responsive to the current risk factor.

2. The driver assistance system of claim 1, wherein building the driver competency profile comprises tracking the driver's overall experience with operating the vehicle.

3. The driver assistance system of claim 1, further comprising a context interface, wherein the driver competency engine is further configured to track the driver's operation of the vehicle relative to a context detected via the context interface.

4. The driver assistance system of claim 3, wherein the detected context comprises a factor selected from the group consisting of weather, visibility, temperature, time of day, road conditions, traffic, road type, road shape, road size, terrain type, construction, vehicle type, vehicle capabilities, vehicle safety features, vehicle condition, vehicle maintenance state, presence of passengers, number of passengers, identity of passengers, noise level, and driver's stress level.

5. The driver assistance system of claim 1, wherein the driver competency engine is further configured to load a saved driver competency profile, and wherein building the driver competency profile comprises updating the saved driver competency profile.

6. The driver assistance system of claim 5, wherein loading the saved driver competency profile comprises retrieving the driver competency profile from a network location.

7. The driver assistance system of claim 1, wherein evaluating the driver's operation of the vehicle comprises retrieving from a storage a composite profile of a plurality of other drivers.

8. The driver assistance system of claim 7, wherein the composite profile is crowd-sourced to a network location.

9. The driver assistance system of claim 1, wherein the driver competency engine is further configured to act on computing the risk factor.

10. The driver assistance system of claim 9, wherein acting on the risk factor comprises providing advice for the driver.

11. The driver assistance system of claim 9, wherein acting on the risk factor comprises determining that the risk factor exceeds a risk threshold and operating an actuator to take at least partial control of the vehicle.

12. The driver assistance system of claim 9, wherein acting on the risk factor comprises providing data to a third party.

13. One or more tangible, non-transitory computer-readable storage mediums having stored thereon executable instructions for providing a driver competency engine for a driver of a vehicle, the driver competency engine configured to:
   detect the identity of the driver via a detector;
   evaluate the driver's operation of the vehicle, comprising receiving operational inputs from one or more operational sensors;
   build a driver competency profile based at least in part on the evaluating;

compute a current risk factor of the form $$RF = \frac{avg(DS, DG)}{K},$$

wherein RF is the risk factor, DS is a normalized speed deviation, DG is a normalized g-force deviation, and K is a constant; and take autonomous or semi-autonomous control of the vehicle or provide user advice responsive to the current risk factor.

14. The one or more tangible, non-transitory computer-readable mediums of claim 13, wherein building the driver competency profile comprises tracking the driver's overall experience with operating the vehicle.

15. The one or more tangible, non-transitory computer-readable mediums of claim 13, wherein the driver competency engine is further configured to track the driver's operation of the vehicle relative to a detected context, comprising receiving contextual inputs from one or more contextual sensors.

16. The one or more tangible, non-transitory computer-readable mediums of claim 15, wherein the detected context comprises a factor selected from the group consisting of weather, visibility, temperature, time of day, road conditions, traffic, road type, road shape, road size, terrain type, construction, vehicle type, vehicle capabilities, vehicle safety features, vehicle condition, vehicle maintenance state, presence of passengers, number of passengers, identity of passengers, noise level, and driver's stress level.

17. The one or more tangible, non-transitory computer-readable mediums of claim 13, wherein the driver competency engine is further configured to load a saved driver competency profile from a storage, and wherein building the driver competency profile comprises updating the saved driver competency profile to the storage.

18. The one or more tangible, non-transitory computer-readable mediums of claim 17, wherein loading the saved driver competency profile comprises retrieving the driver competency profile from a network location.

19. The one or more tangible, non-transitory computer-readable mediums of claim 13, wherein evaluating the driver's operation of the vehicle comprises retrieving a composite profile of a plurality of other drivers.

20. The one or more tangible, non-transitory computer-readable mediums of claim 19, wherein the composite profile is crowd-sourced to a network location.

21. The one or more tangible, non-transitory computer-readable mediums of claim 13, wherein the driver competency engine is further configured to act on computing the risk factor, wherein acting on the risk factor comprises an action selected from the group consisting of providing advice for the driver, determining that the risk factor exceeds a risk threshold and operating an actuator to take at least partial control, and providing data to a third party.

22. A method of providing a driver competency engine for a driver of a vehicle, comprising:
   detecting the identity of the driver via an identity sensor;
   evaluating the driver's operation of the vehicle comprising receiving operational inputs from one or more operational sensors;
   building a driver competency profile based at least in part on the evaluating;
   computing a current risk factor of the form $$RF = \frac{avg(DS, DG)}{K},$$

wherein RF is the risk factor, DS is a normalized speed deviation, DG is a normalized g-force deviation, and K is a constant; and taking autonomous or semi-autonomous control of the vehicle or provide user advice responsive to the current risk factor.

23. The method of claim 22, further comprising tracking the driver's operation of the vehicle relative to a detected context, comprising receiving contextual inputs via one or more contextual sensors.

* * * * *